(12) United States Patent
Lieze, Jr. et al.

(10) Patent No.: US 8,544,521 B2
(45) Date of Patent: Oct. 1, 2013

(54) MOBILE TARPING SYSTEM

(76) Inventors: Anthony P. Lieze, Jr., Deptford, NJ (US); Harry A. Lieze, Sicklerville, NJ (US)

(*) Notice: Subject to any disclaimer, the term of this patent is extended or adjusted under 35 U.S.C. 154(b) by 0 days.

(21) Appl. No.: 13/366,434

(22) Filed: Feb. 6, 2012

(65) Prior Publication Data
US 2013/0199738 A1  Aug. 8, 2013

(51) Int. Cl.
*B60J 11/02* (2006.01)

(52) U.S. Cl.
USPC .................................. 160/24; 296/98

(58) Field of Classification Search
USPC ............... 160/24; 296/98, 100.17, 100.18
See application file for complete search history.

(56) References Cited

U.S. PATENT DOCUMENTS

| | | | | |
|---|---|---|---|---|
| 1,089,611 | A * | 3/1914 | Wilson | 160/24 |
| 1,412,697 | A * | 4/1922 | Macavoy | 160/24 |
| 2,498,563 | A * | 2/1950 | Mallory | 160/24 |
| 4,842,323 | A * | 6/1989 | Trickett | 296/98 |
| 6,109,680 | A * | 8/2000 | Horner et al. | 296/98 |
| 6,695,382 | B2 * | 2/2004 | Ciferri et al. | 296/98 |
| 7,350,846 | B2 * | 4/2008 | Smith | 296/100.01 |

* cited by examiner

*Primary Examiner* — David Purol
(74) *Attorney, Agent, or Firm* — Stuart M. Goldstein

(57) ABSTRACT

A mobile tarping system has a framework with a base section and a height adjustable main section connected to a cradle support. A rolled up tarp within the cradle support, can be unrolled and retracted by a spring-loaded roll-out and retraction assembly or a manual crank for covering the open container. The system is separate and independent from the container. Wheels extending from the base section permit the mobile tarping system to be transported between various containers, when a given container is filled with loose debris and must be covered.

6 Claims, 5 Drawing Sheets

MOBILE TARPING SYSTEM

FIELD OF THE INVENTION

The invention relates to covers for open top dumpsters and refuse containers and specifically to a mobile, portable tarp covering system for such container enclosures.

BACKGROUND OF THE INVENTION

Open top style dumpsters and containers are commonly used both outdoors and indoors to collect a variety of refuse such as organic leaves, industrial waste, construction debris, recycled paper and other loose material, etc. Much of this refuse is lightweight and thus is subject to being blown or otherwise lifted out from containers. There are many lid, cover, or tarping assemblies, permanently fitted to containers, which effectively close off their open tops. There are also cover and tarping systems which are integral components of dumpster trucks or other waste transport vehicles which comprise refuse containing receptacles. Many of these vehicles utilize tarp roll-out systems to cover their containers when they are filled with loose debris. However, in all these and like cases, the covering systems are included as permanent, fixed assemblies of the various containers. Although integral with such containers, in many instances, covers are not needed and are therefore an unwelcomed encumbrance.

This is especially true with regard to stand alone dumpster and containers, many of which are unused or stand largely empty much of the time in warehouses, worksite, yards, or different outdoor facilities. There is no need for a workplace to have multiple containers with integral cover systems, when only one or two containers are actually in use at a lime. Moreover, providing every container with a permanent cover requires the purchase and maintenance of additional equipment, with the accompanying added expense. Further, if an open top container having no cover system is filled, makeshift covers contorted to hold down loose debris are often impractical and, most importantly, largely ineffective.

There is thus currently no independent, container cover or tarping system which has the versatility and mobility to be used and re-used with multiple, different size open dumpsters or other open waste storage containers.

SUMMARY OF THE INVENTION

It is thus the object of the present invention to provide a mobile tarping system for dumpsters and other waste storage containers which overcomes the disadvantages and limitations of prior tarp covering devices and assemblies.

It is the object of the present invention to provide a refuse container tarping system which is separate and independent from any single container and is mobile and portable for use and re-use with containers of different heights and sizes and which can be moved from container to container, as the need arises.

This object is accomplished by the present invention, a mobile tarping system having a framework with a base section and a height adjustable main section connected to a cradle support. A rolled up tarp within the cradle support can be unrolled and retracted by a spring-loaded roll-out and retraction assembly or a manual crank for covering the open container. The system is separate and independent from the container. Wheels extending from the base section permit the mobile tarping system to be transported between various containers, when a given container is filled with loose debris and must be covered.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 7:
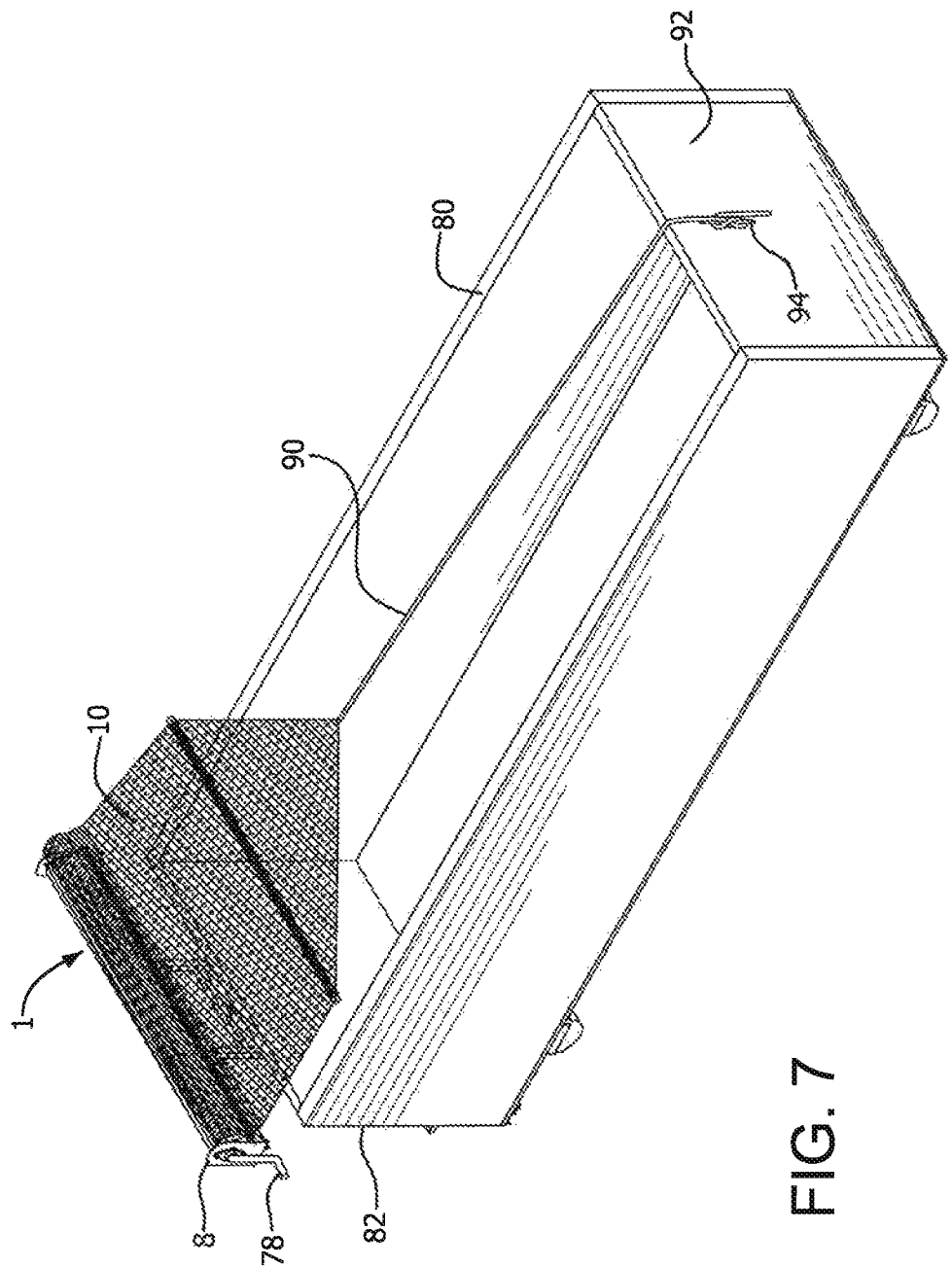
FIG. 7 is an isometric top view of the mobile tarping system of the present invention being deployed over a container.

Mobile tarping system 1 comprises free standing framework assembly 2 having base section 4 and upright, main section 6 extending upward from the base section and connected substantially perpendicularly to it. Support cradle 8 stores tarp 10 in a rolled configuration and maintains the aft end of the tarp in place when it is rolled out to cover container 80, shown in FIG. 7.

Base section 4 comprises forwardly extending arms 12 and 14 and rearwardly stabilizing arms 16 and 18. Cross-strut 20 and strut connecting assemblies 22 and 24 ensure that forward arms 12 and 14 and rear arms 16 and 18 are securely attached. Castors or Wheels 26, 27, 28, and 29 are connected to forward arms 12 and 14, castors or wheels 30 and 31 are connected to cross strut 20 and castors or wheels 32, 33, 34, and 35 are connected to rear arms 16 and 18. The wheels serve to transport system 1 from location to location.

Main section 6 comprises lower support members 42 and 44, interconnected by cross member 50. Support members 42 and 44 are connected to strut connecting assemblies 22 and 24 and cross-strut 20. Support members 42 and 44 are hollow, in order to telescopically receive support members 46 and 48. Support members 46 and 48 are interconnected by cross member 52. Support members 46 and 48 are connected at their top ends to support cradle 8.

Figure 1:
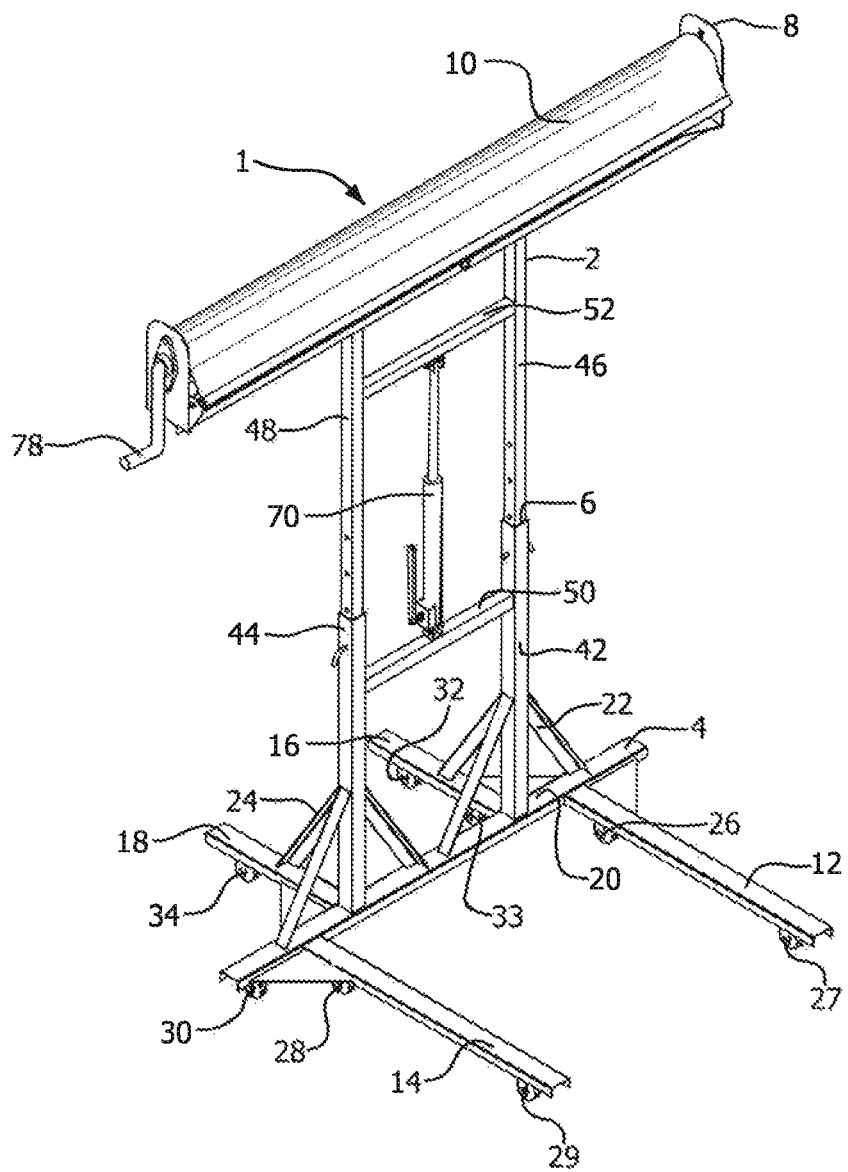
FIG. 1 is an isometric front view of the mobile tarping system of the present invention.
Figure 2:
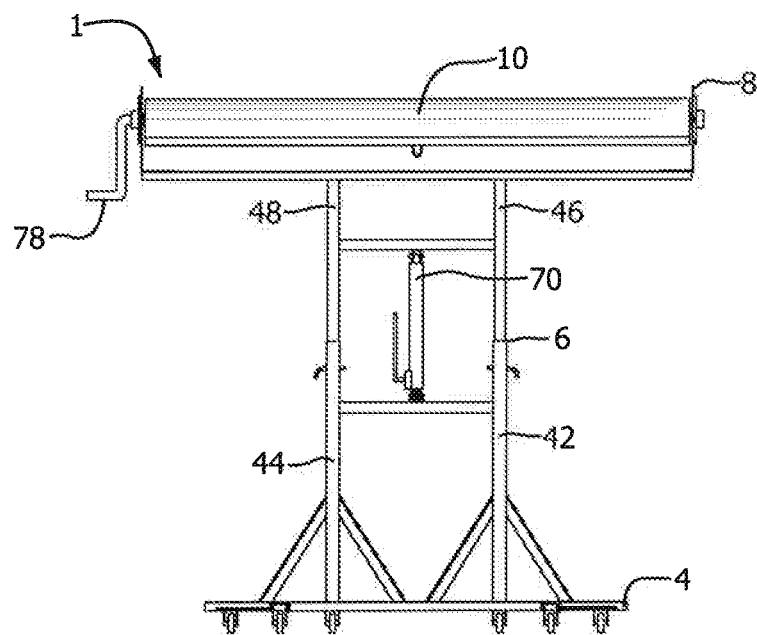
FIG. 2 is a front view of the mobile tarping system of the present invention.
Figure 3:
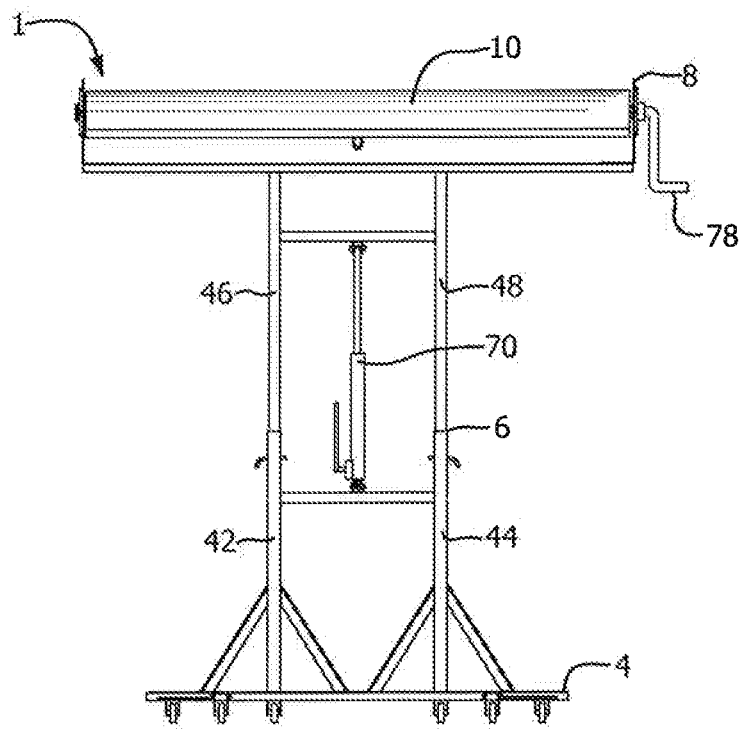
FIG. 3 is a rear view of the mobile taming system of the present invention.
Figure 4:
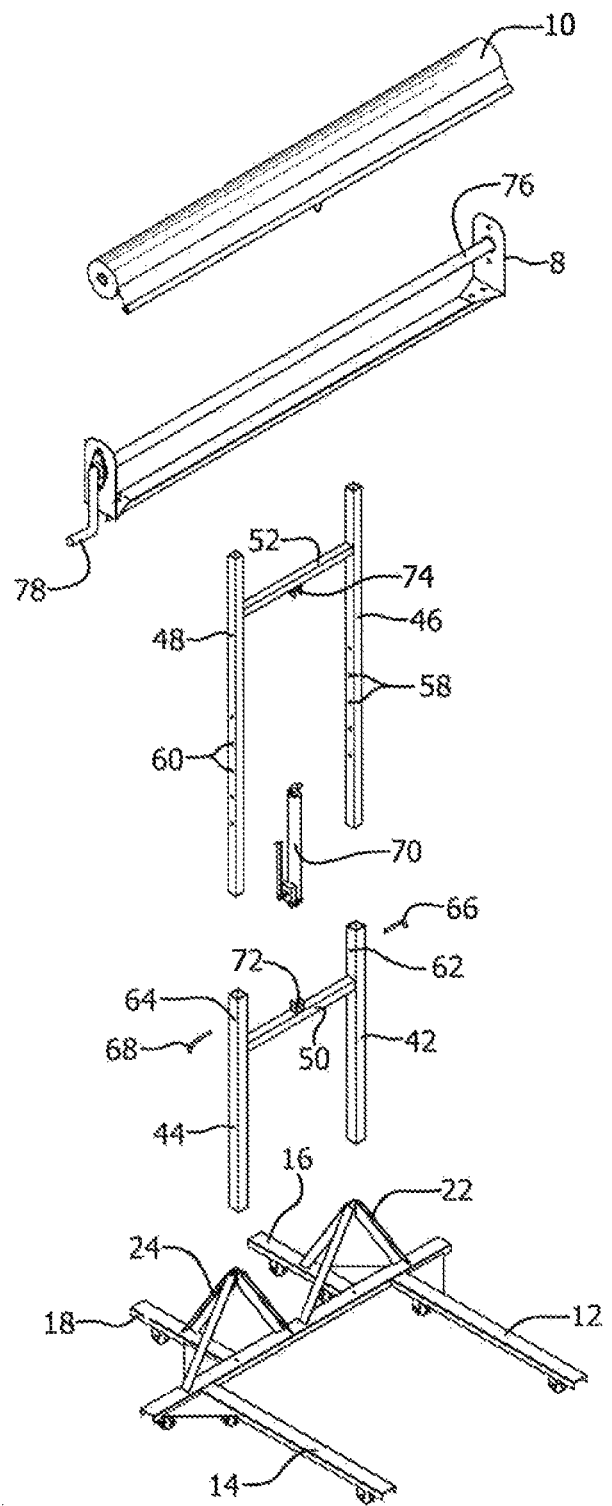
FIG. 4 is an exploded view of the components of the mobile tarping system of the present invention.

Support members 46 and 48 have spaced alignment holes 58 and 60 designed to be aligned with holes 62 and 64 in support members 42 and 44. See FIG. 4. Alignment pins 66 and 68 are configured to be inserted into the alignment holes of support members 42 and 44 and 46 and 48 to maintain these support members and support cradle 8 at various heights in relation to each other.

Hydraulic lift jack 70 is located between cross members 50 and 52 of support members 42 and 44 and 46 and 48. Lift jack is maintained in place by mounting brackets 72 and 74 on cross members 50 and 52.

Support cradle 8 carries and maintains spring loaded roll-out and retraction assembly 76 on which tarp 10 is mounted. Assembly 76 and its manner of operation in tarp roil-out and retraction is known the art, exemplified by the spring loaded tarp assembly disclosed in U.S. Pat. No. 7,802,610.

Figure 5:
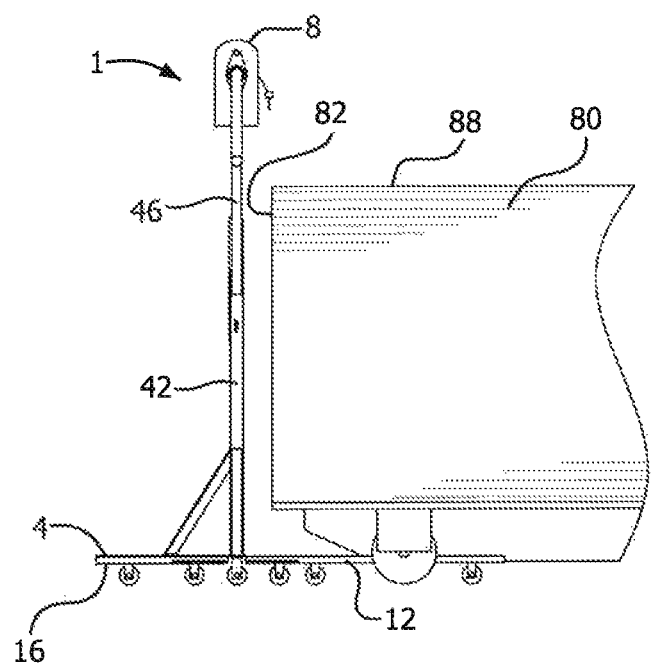
FIG. 5 is a partial elevation view of the mobile tarping system of the present invention in use with a container.
Figure 6:
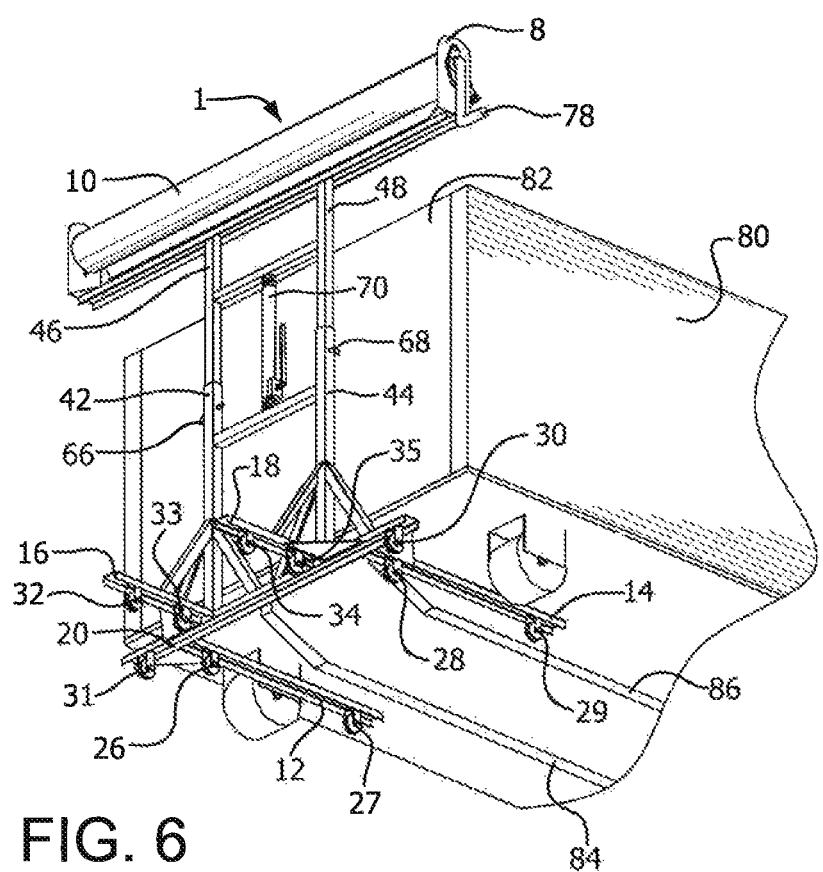
FIG. 6 is a partial rear isometric view of the mobile tarping system of the present invention in use with a container.

In use, tarping system 1 is manually rolled on wheels 26-35 into position near rear end 82 of topless container 80, such that main section 6 is adjacent to the container and forwardly extending arms 12 and 14 are underneath the container, spaced from container skid rails 84 and 86. See FIGS. 5 and 6. Lift jack 70 is then operated to raise or lower support members 46 and 48. When the proper height is reached such that cradle 8 is over top 88 of container 80, support members 42 and 46 and 44 and 48 are secured together at this height by the insertion of alignment pins 66 and 68 into the appropriately aligned holes 58 and 62 and holes 60 and 64. Line 90, detachably connected to tarp 10, is then pulled to unroll and extend the tarp over open container 80. See FIG. 7. Tarp 10 can then be secured to front end 92 of container 80, by tying off line 90 to a cleat, hook, or other equivalent means 94.

When tarp 10 is no longer needed to cover container 80, the end of the tarp is simply unsecured from front cleat 94 on end 92 and retracted back into cradle 8 by roll-out and retraction assembly 76. Tarping system 1 can then be moved away from container 80 for use with another refuse filled container.

Crank 78 is provided on cradle 8 as an alternate means of retracting tarp 10 or as a back-up, in the event that retraction assembly 76 is inoperable.

It is contemplated that tarp 10 will be made of a lightweight, mesh type material. However, it can be made of canvas, plastic, or any equivalent high strength material.

Tarping system 1 of the present invention thus provides a portable, mobile system for temporarily and effectively covering stationary, loaded refuse containers, dumpsters, or like waste containers. The system can easily be utilized again and again, with a variety of such containers with varying heights.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A mobile tarping system for covering an open refuse container, the system being an independent, stand along unit, consisting solely of a framework assembly, a tarp for covering the top of the container, and a support cradle for storing the tarp in a rolled up configuration and for maintaining the tarp in an unrolled configuration to cover the top of the container, said cradle comprising means for unrolling the tarp to cover the top of the container and for rolling the tarp up into the cradle;

said framework assembly comprising:
a base section having forwardly extending arms and rearwardly extending arms for stabilizing the base section and transport means located on both the forwardly and rearwardly extending arms for moving the entire system towards a container to position the forwardly extending arms underneath the container and for moving the system away from the container, such that the system is completely separate from and independent of the container; and
a main section extending up from the base section, the main section being connected and substantially perpendicular to the base, said main section comprising telescoping framing members and means to adjust the height of the main section by raising and lowering one of the framing members, said adjusting means being located between the framing members, the framework assembly and support cradle comprising an independent, self-supporting, stand alone member, unattached to and separate from any other structure.

2. The mobile tarping system as in claim 1 wherein the adjusting means comprises a jack unit loaded between the framing members.

3. The mobile tarping system as in claim 1 wherein the transport means comprises wheels.

4. The mobile tarping system as in claim 1 further comprising means for unrolling the tarp to cover the container and for rolling the tarp up into the support means.

5. The mobile tarping system as in claim 4 wherein the means for unrolling and rolling up the tarp comprises a spring loaded roll-out and retraction assembly.

6. The mobile tarping system as in claim 4 wherein the means for unrolling and rolling the tarp comprises a crank.

\* \* \* \* \*